United States Patent
Iraschko et al.

(10) Patent No.: US 8,636,118 B2
(45) Date of Patent: Jan. 28, 2014

(54) METHOD FOR FIXING AN ADJUSTMENT DEVICE ON A DISC BRAKE

(75) Inventors: Johann Iraschko, Schweitenkirchen (DE); Georg Kempinger, Eching (DE); Florian Orgler, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 297 days.

(21) Appl. No.: 13/016,418

(22) Filed: Jan. 28, 2011

(65) Prior Publication Data

US 2011/0203886 A1 Aug. 25, 2011

Related U.S. Application Data

(63) Continuation of application No. PCT/EP2009/005409, filed on Jul. 27, 2009.

(30) Foreign Application Priority Data

Jul. 30, 2008 (DE) .......................... 10 2008 035 369

(51) Int. Cl.
*F16D 55/02* (2006.01)
(52) U.S. Cl.
USPC ...................... 188/71.8; 188/196 V
(58) Field of Classification Search
USPC ............ 188/71.8, 71.9, 72.7, 196 BA, 196 D, 188/196 P, 196 V, 202
See application file for complete search history.

(56) References Cited

U.S. PATENT DOCUMENTS

| | | | |
|---|---|---|---|
| 3,355,197 A | 11/1967 | Tessmer | |
| 5,680,912 A | 10/1997 | Herbert et al. | |
| 6,213,255 B1 * | 4/2001 | Neuwirth | ............... 188/71.9 |
| 7,484,602 B2 * | 2/2009 | Iraschko et al. | ......... 188/196 BA |
| 7,694,784 B2 * | 4/2010 | Iraschko | ............... 188/196 D |
| 7,926,626 B2 * | 4/2011 | Iraschko | ............... 188/72.7 |
| 2007/0209890 A1 | 9/2007 | Iraschko | |
| 2009/0260930 A1 | 10/2009 | Lotz | |

FOREIGN PATENT DOCUMENTS

| | | |
|---|---|---|
| DE | 80 01 782 U1 | 1/1980 |
| DE | 197 29 024 C1 | 1/1999 |

(Continued)

OTHER PUBLICATIONS

International Search Report dated Oct. 15, 2009 with English translation (six (6) pages).

(Continued)

*Primary Examiner* — Pamela Rodriguez
(74) *Attorney, Agent, or Firm* — Crowell & Moring LLP

(57) ABSTRACT

A method is provided for fixing an adjustment device on a disc brake, particularly a pneumatically actuated disc brake. The adjustment device is inserted in a previously adjusted idle position into an adjusting spindle of the disc brake, wherein a coupling of a shift fork of the adjustment device is carried out with a rotating lever of the disc brake, and a centering is carried out by a bearing disc of the adjustment device in a receptacle of a brake caliper. The adjustment device is positioned by twisting the same. The adjustment device is secured on the disc brake by locking the bearing disc on the brake caliper by a locking element.

11 Claims, 4 Drawing Sheets

(56) References Cited

FOREIGN PATENT DOCUMENTS

| | | |
|---|---|---|
| DE | 199 03 620 C1 | 5/2000 |
| DE | 10 2004 037 771 A | 3/2006 |
| DE | 20 2006 010 681 U1 | 12/2007 |
| EP | 0 614 025 A1 | 9/1994 |
| EP | 0 753 683 A2 | 1/1997 |
| GB | 2 332 027 A | 6/1999 |
| JP | 63-259229 A | 10/1988 |

OTHER PUBLICATIONS

German Office Action dated May 28, 2009 with English translation (ten (10) pages).

Japanese Office Action Dated Aug. 27, 2013 w/ English translation (7 pages).

* cited by examiner

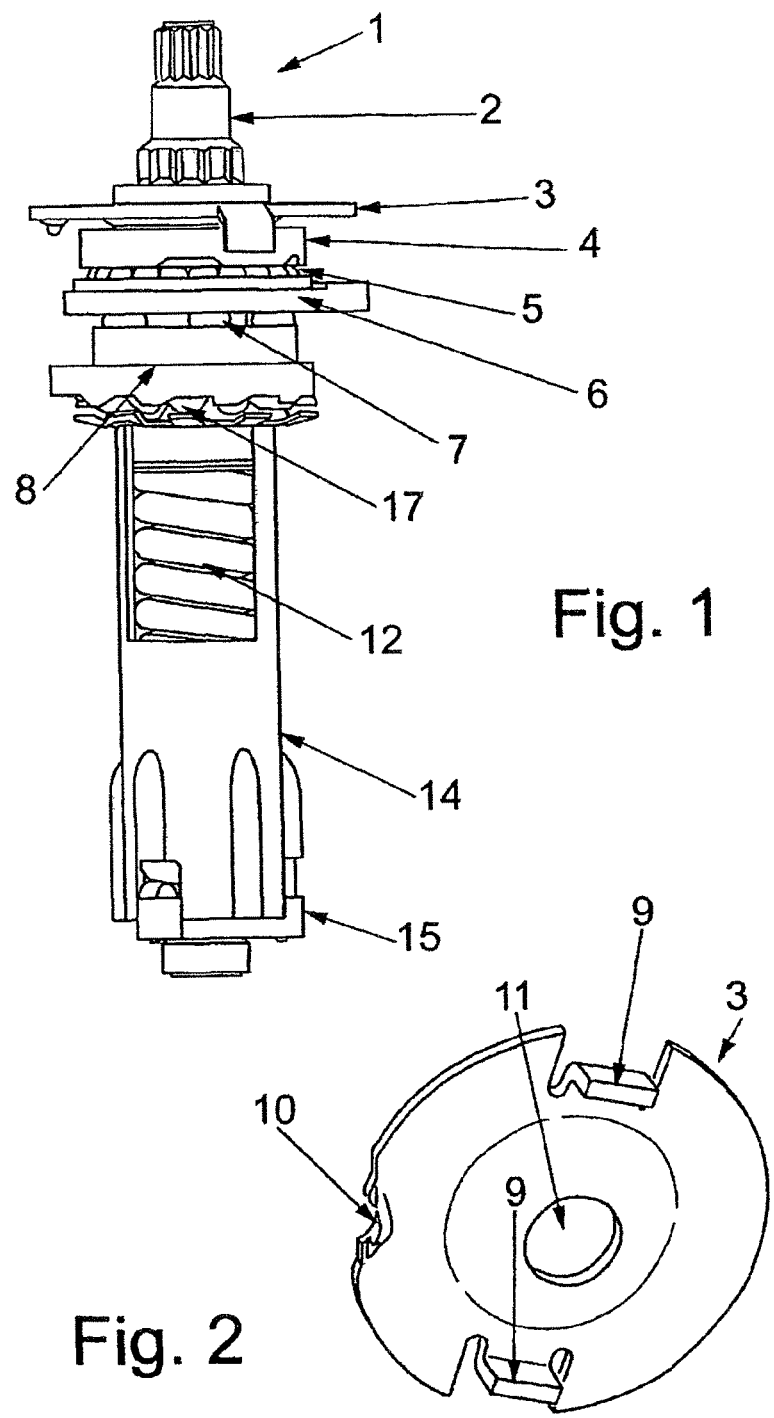

PRIOR ART

METHOD FOR FIXING AN ADJUSTMENT DEVICE ON A DISC BRAKE

CROSS-REFERENCE TO RELATED APPLICATIONS

This application is a continuation of PCT International Application No. PCT/EP2009/005409, filed Jul. 27, 2009, which claims priority under 35 U.S.C. §119 from German Patent Application No. DE 10 2008 035 369.8, filed Jul. 30, 2008, the entire disclosures of which are herein expressly incorporated by reference.

This application contains subject matter related to U.S. application Ser. Nos. 13/015,974, 13/015,954, 13/016,078, and 13/015,930, entitled "A Disc Brake Adjusting Device Having an Output Side Coupling Ring with a Defined Working Rotational Axis," "A Disc Brake Adjusting Device Having a Cone Clutch Utilizing Clamping Balls," "A Disc Brake Adjustment Device Having a Blocking Device," and "A Disc Brake Adjusting Device with a Torque Dependent Coupling" filed on even date herewith.

BACKGROUND AND SUMMARY OF THE INVENTION

The invention relates to a method for fixing an adjusting device on a disc brake, in particular a pneumatically actuated disc brake.

Pneumatically actuated disc brakes have over time become standard equipment on heavy commercial vehicles. Such disc brakes require mechanical boosting or "force amplification" in order to produce the demanded brake application force, because the force of the pneumatically charged brake cylinders is restricted on account of the pressure level (at present approximately 10 bar) and the limited structural size of the brake cylinder. Presently known pneumatically actuated disc brakes have boost ratios of between 10:1 and 20:1. The piston strokes of the brake cylinders are in the range from 50 mm to 75 mm, resulting in brake application travels of approximately 4 mm for pressing the brake pads against the brake disc.

The friction material thickness of the brake pads lies in the range of 20 mm, and because two pads are installed, this results in a wear travel of approximately 40 mm, not taking disc wear into consideration. This travel is a multiple greater than the abovementioned brake application travel. It is therefore necessary for the brake to be adjusted correspondingly to the pad wear by means of a device. The prior art provides automatic wear adjustment by which the so-called air play, that is to say the gap between the brake pads and the brake disc in the non-actuated state, is kept constant independently of the wear state and wear behavior of the brake pads.

In commercial vehicles, use is very often made of disc brakes which have a wear adjustor which is arranged concentrically in the cavity of a threaded spindle and which is driven eccentrically by the brake lever via a drive element (shift finger). During a braking process, the brake lever which is coupled to the piston rod of the brake cylinder performs a rotational movement. Before the rotational movement of the rotary lever is introduced into the adjustor via the coupling mechanism of the adjusting device (shift fork and shift finger), a so-called idle travel must be overcome. This travel is decisive of the size of the so-called air play, because during the movement, the adjustment is not activated, and the brake application travel therefore constitutes the air play. After the idle travel is overcome, the adjustor is set in a rotational movement, and an adjusting process is initiated by the coupling to the threaded spindle or tube.

Adjusting devices for disc brakes exist in various embodiments. DE 10 2004 037 771 A1 (having U.S. counterpart published application US2007/209890 A1) discloses an adjusting device for a disc brake, the specifications of which are expressly incorporated by reference herein. The adjusting device is suitable for a pneumatically actuated disc brake, in particular one of sliding-caliper design. Furthermore, the adjusting device can, however, also be used in pneumatically actuated fixed-caliper or pivoting-caliper disc brakes.

DE 10 2004 037 711 A1 describes an adjustor of the type, which is shown in FIG. 5. The adjustor is composed substantially of the following functional elements: shaft 2; bearing disc 3; axial bearing 5; collar bush, or spacer sleeve 19; shift fork, or drive ring 6; ball ramp clutch 7; cone clutch 17; and cylindrical spring 12. With regard to the description, reference is made to DE 10 2004 037 711 A1 (US 2007/209890 A1).

The adjusting device must basically perform two functions:

1. the automatic air play adjustment; and
2. the manual restoration or retraction of the adjusting mechanism upon renewal of the brake linings.

In order that the function of the wear adjusting device is ensured for an automatic adjustment process during braking and for a manual restoration when replacing brake pads, it is necessary for the adjusting device to be fixed in the brake caliper and positioned relative to the brake lever.

In the light of production tolerances and the relatively high degree of variation of mass-produced components, individual positioning and fixing of the adjusting device is problematic.

It is therefore necessary, when installing the adjusting device into the brake, for the fixing of the adjusting device to be carried out correspondingly to the existing tolerance situation. The present state of the art is rotational fixing by use of a lug on the bearing disc of the adjusting device and a corresponding pocket in the brake caliper. With this arrangement, however, it is not possible to individually position the adjusting device. To permit individual positioning, therefore, a locking method is required which has a capacity for adaptation.

Corresponding methods would, for example, be welding or adhesive bonding. In the case of welding, however, there is the difficulty that this can be integrated within an assembly process only with a high level of expenditure (protection from radiation and welding gases). Furthermore, the welding of different materials, such as in this case nodular graphite iron and steel, is relatively difficult.

In the case of adhesive bonding, the surfaces must be very clean and free from grease, and ensuring this is likewise associated with a very high level of expenditure, because numerous components must be assembled with grease for their permanent function.

Both methods also have the disadvantage that disassembly is difficult or impossible.

It is therefore the object of the present invention to provide an improved method for fixing an adjusting device to a disc brake, with the above disadvantages being eliminated or significantly reduced, and further advantages being obtained.

This and other objects are achieved by a method for fixing an adjusting device on a disc brake, in particular, a pneumatically actuated disc brake, as well as by a correspondingly assembled disc brake. The method includes the steps of: (a) inserting the adjusting device in a previously set rest position into an adjusting spindle of the disc brake, with a drive ring of the adjusting device being coupled to a rotary lever of the disc brake and with centering being provided by a bearing disc of the adjusting device in a receptacle of a brake caliper; (b) positioning the adjusting device by turning the latter; and (c) fixing the adjusting device to the disc brake by locking the bearing disc to the brake caliper by way of a locking element.

By use of the method according to the invention, fixing of the adjusting device is carried out, after positioning has taken place, by virtue of a locking element, for example a ball or a short cylindrical pin, being pressed into a recess of a brake caliper of a disc brake.

The pressing-in of the ball results firstly in a pressure force between the bearing disc and caliper and secondly in a positive-fitting connection as a result of the deformation on the bearing disc. A reliable, permanent anti-twist facility for the adjusting device is ensured in this way. Disassembly is likewise possible with this fastening method.

The adjusting device is firstly inserted, in a previously set rest position, into an adjusting spindle of the disc brake, with a drive ring (for example with a shift fork) of the adjusting device being coupled to a rotary lever of the disc brake and with centering being provided by a bearing disc of the adjusting device in a receptacle of a brake caliper. The adjusting device is then individually positioned by turning the latter, with a deformation section of the bearing disc being arranged over a recess provided in the brake caliper.

The locking element is pressed, between the bearing disc of the adjusting device and the brake caliper, into the recess. The size of the ball is selected such that, on the caliper, the hitherto existing recess in the caliper can be used. As a result, it is not necessary to carry out any additional machining processes on the brake caliper. The bearing disc of the adjusting device or of the adjustor is designed such that sufficiently intense compression and deformation takes place without excessively high assembly forces arising in the process.

A disc brake, in particular a pneumatically actuated disc brake, having an adjusting device for adjusting for wear of the brake pads and the brake disc of a pneumatically actuated disc brake having a rotary-lever-actuated brake application device, which adjusting device can preferably be inserted into an adjusting spindle of the disc brake and attached by a bearing disc to a brake caliper, which has a recess, of the disc brake, is characterized in that the bearing disc is connected in a positive-fitting manner to the brake caliper by a locking element when the adjusting device is positioned.

The bearing disc is provided with at least one deformation section for positive-fitting connection to the brake caliper and with at least one lug for rotationally fixed connection to the adjusting device.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a partial section illustration of an exemplary embodiment of an adjusting device according to the invention;

FIG. 2 is an enlarged perspective view of an exemplary embodiment of a bearing disc;

DETAILED DESCRIPTION OF THE DRAWINGS

Figure 3:
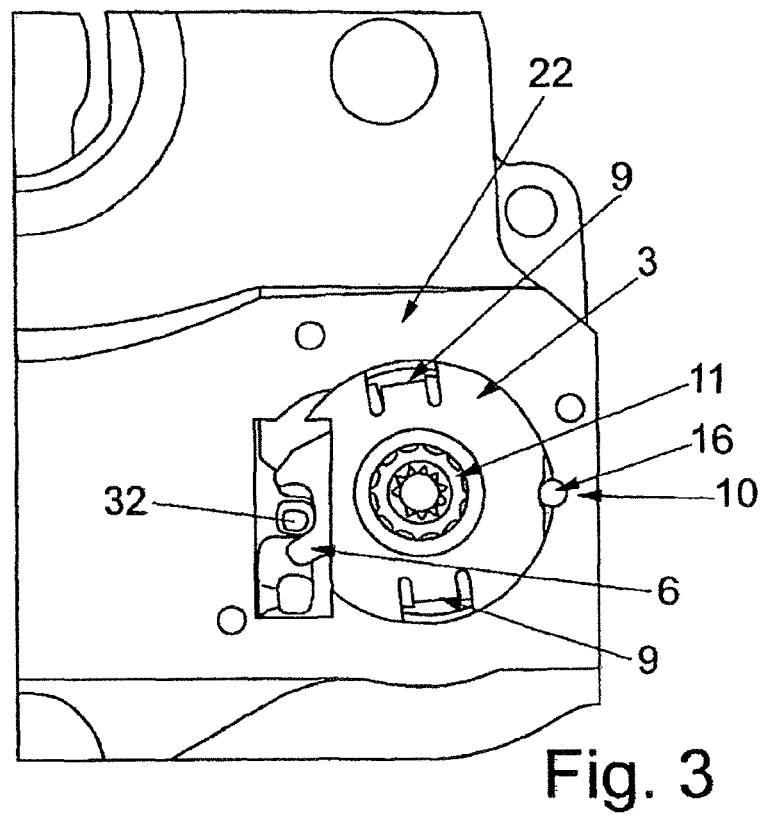
FIG. 3 is a plan view of the adjusting device installed into a brake caliper, with bearing disc fixed.

Elements with the same or similar functions are provided with the same reference numerals in the figures.

Figure 6:
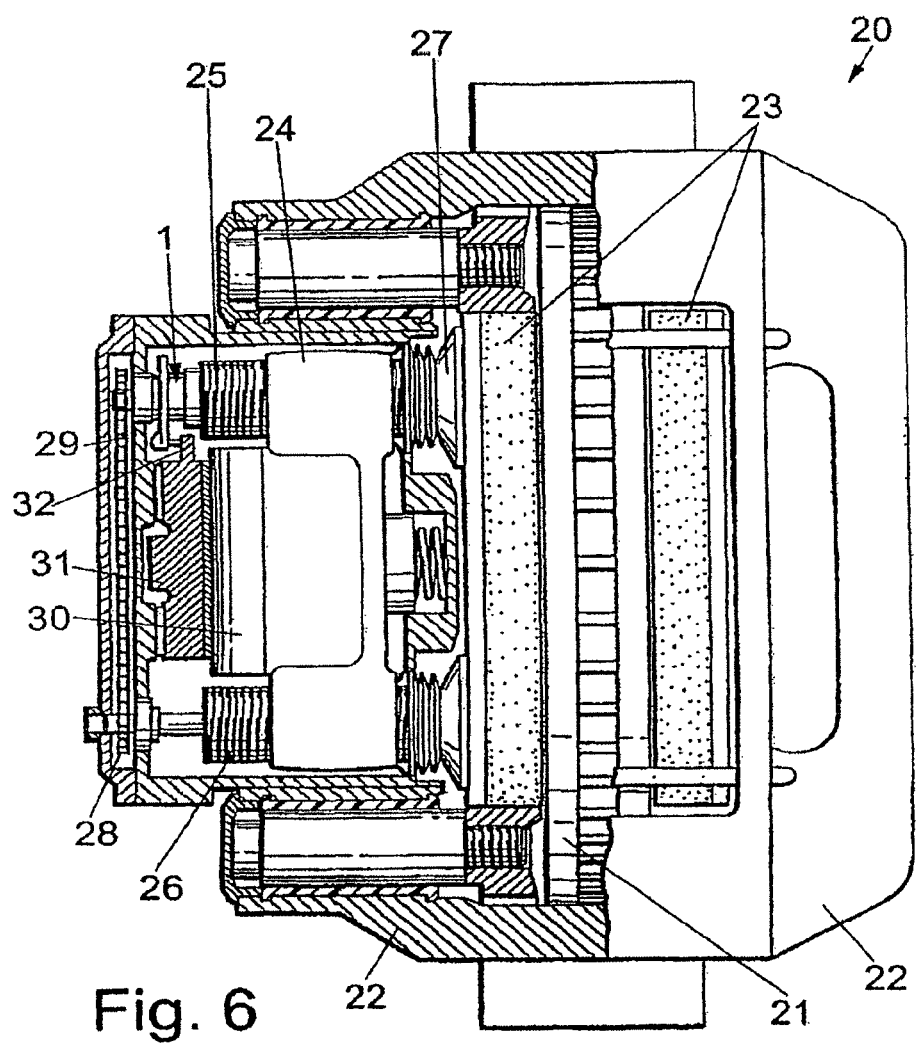
FIG. 6 is a schematic illustration of a disc brake.

With regard to the design and function of a pneumatic disc brake according to FIG. 6, reference is made to the corresponding description of DE 197 29 024 C1, the specification of which is expressly incorporated by reference herein. The following components are indicated in FIG. 6: disc brake 20, brake disc 21, brake caliper 22, brake pads 23, cross-member (bridge) 24, adjusting spindles 25 and 26, thrust pieces 27, sprockets 28, chain 29, eccentric 30 and rotary lever 31, which has a drive element 32 interacting with a shift fork of an adjusting device 1. The adjusting device 1 is in this case arranged in the adjusting spindle 25. An adjusting device 1 will now be explained in more detail. The adjusting device 1 would also be suitable for an electromotively actuated disc brake.

FIG. 1 is a partial section illustration of an exemplary embodiment of an adjusting device 1 according to the invention. The adjusting device 1 has the following: a shaft 2, having a drive journal at its upper end; a bearing disc 3 for fastening the adjusting device 1 in the brake caliper 22 (see FIGS. 3 and 6); a collar bush 4 which is rotationally fixedly coupled to the bearing disc 3 by way of lugs 9 (see FIG. 2) and has an upper collar with a running surface arranged therebelow for balls of an axial bearing 5; a drive ring 6 which is connected to a shift fork which is coupled to the drive element 32 (see FIGS. 3 and 6) of the rotary lever 31; a ball ramp clutch 7 having a clutch ring 8 which interacts with balls and a tapered bush which is connected to a spring sleeve 14 for conjoint rotation therewith; a cylindrical spring 12 which is arranged in the spring sleeve 14 and which is supported on a profiled disc 15; and an adjusting element, for example a nut, which is arranged on the lower end of the shaft 2 and serves for stressing the cylindrical spring 12 and holding the elements of the adjusting device 1 together axially. The general function of the adjusting device 1 is described in detail in DE 10 2004 037 771 A1 with regard to FIG. 5, to which reference is hereby made.

Figure 5:
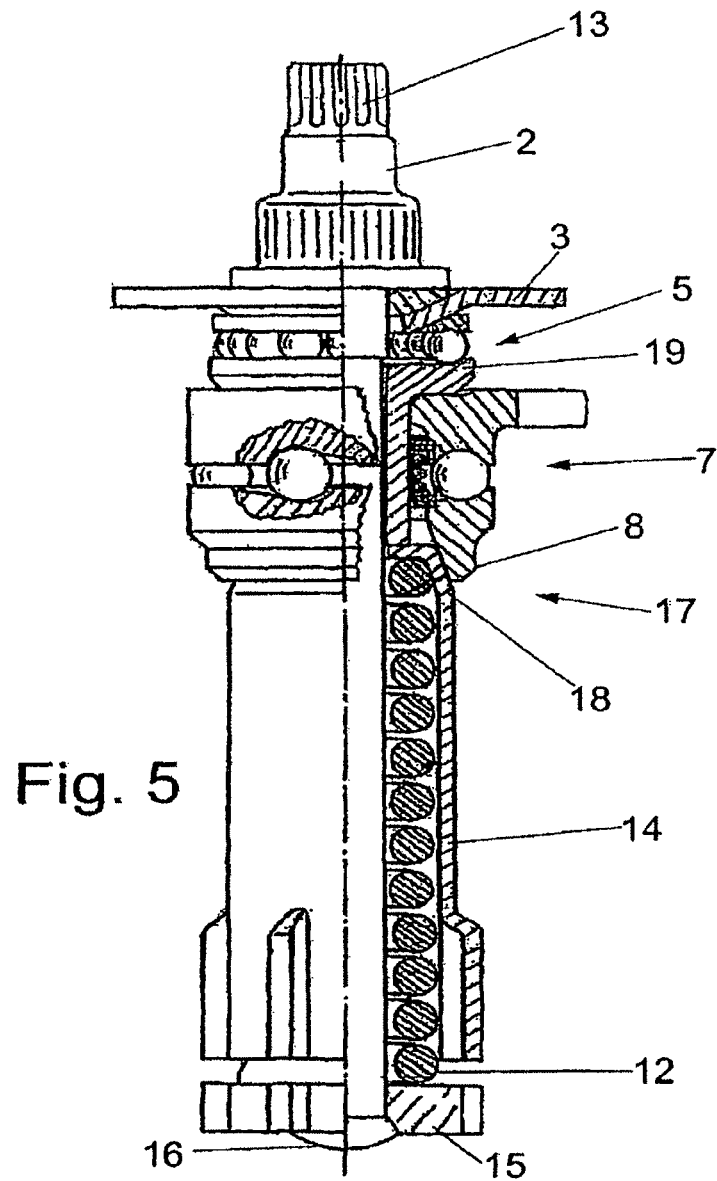
FIG. 5 is a partial section illustration of an adjusting device according to the prior art.

As a first difference in relation to the adjusting device known from FIG. 5, in the adjusting device 1 according to the present invention, the axial bearing 2 is formed from the collar of the collar bush 4, from one side of the drive ring 4 and from rolling bodies. The lower end of the collar bush 4, which extends through the ball ramp clutch 7, interacts with a clutch ring of the cone clutch 17, with a limited working angle of rotation being defined. The locking of the collar bush 4 to the bearing disc 3 is in this example realized by virtue of bent lugs 9 (FIG. 2) of the bearing disc 3 engaging into radial recesses on the circumference of the collar of the collar bush 4.

FIG. 2 shows a perspective illustration of the bearing disc 3, which has a leadthrough 11 for the shaft 2. Two radially opposite angled lugs 9 are provided for connecting to the collar bush 8. The bearing disc 3 is also formed with a deformation section 10 for fixing to the brake caliper 2, as will be explained in more detail further below.

To allow the adjusting device 1 to be turned back (i.e., retracted) manually, exact positioning relative to the rotary lever 31 (see FIGS. 3 and 6) is necessary. When turning back manually, the blocking action of the ball ramp clutch 7 and of the cone clutch 17 must be eliminated in the rest position of the adjusting device 1. The rest position is the initial position proceeding from which an adjustment process is initiated by way of the rotary lever during a braking process. The retraction of the adjusting device 1 is also carried out in the rest position.

To ensure this, it is necessary, by means of a stop, to prevent the clutch ring 8 from turning back. The bore of the clutch ring 8 therefore has a stop (not shown), by which the clutch ring 8 is also prevented from turning back when the adjusting device 1 is in the rest position during a restoring process. The clutch ring 8 is supported, by way of the lugs 9 on the bearing disc 3, rotationally fixedly mounted collar bush 4, which has a stop (not illustrated here) matching the stop of the clutch ring 8. The two stops are coordinated with one another such that the clutch ring 8 has the clearance necessary for a working angle, that is to say for the angle of twist of the adjusting device 1 effected by the rotary lever 31, for the automatic air play adjustment. In order that the clamping action of the freewheel does not take effect in the rest position, it is highly important for the collar bush 4 and the clutch disc 8 which is coupled by means of the stops to be positioned correctly.

Figure 4:
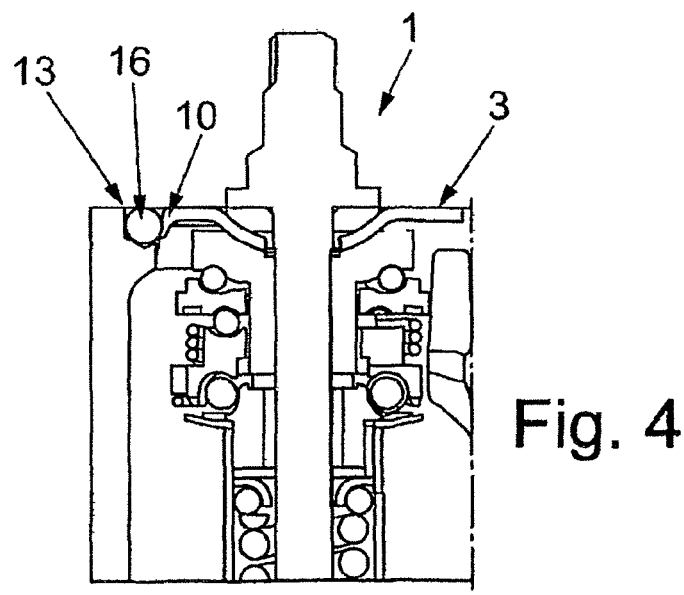
FIG. 4 is a sectional view taken along the longitudinal axis of the adjusting device according to FIG. 3.

FIG. 3 shows a plan view of the adjusting device 1 installed in the brake caliper 22, with bearing disc 3 fixed. FIG. 4 illustrates a sectional view taken along the longitudinal axis of the installed adjusting device according to FIG. 3.

A method for fixing the adjusting device 1 will now be explained. The adjusting device is firstly inserted, in the previously set rest position, into an adjusting spindle 25, 26 of the disc brake 20 (see FIG. 6), with a shift fork of the drive ring 6 of the adjusting device 1 being coupled to the rotary lever 31 (in this case to a drive element 32), and with centering being provided by the bearing disc 3 in a receptacle or opening of the brake caliper 22. The adjusting device 1 can now be turned in order to provide exact positioning, for example by means of setting templates, such that the illustrated position of shift fork and drive element 32 is obtained.

In the position thus set, the deformation section 10 (FIG. 2) is situated over a recess 13 of the brake caliper 22. Fixing of the adjusting device to the disc brake 20 is now realized by locking the bearing disc 3 to the brake caliper 22 by use of a locking element 16, for example a ball or a cylindrical pin. The locking element 16 may, for example, be pressed in. Here, as shown in FIG. 4, the deformation section 10 is deformed into the recess 13 and, together with the locking element 16, forms a positive-fitting connection of the bearing disc 3 to the brake caliper 22.

The size of the ball is selected such that, on the caliper, the hitherto existing recess in the caliper can be used. As a result, it is not necessary to carry out any additional machining processes on the brake caliper. The bearing disc of the adjusting device or of the adjustor is designed such that sufficiently intense compression and deformation takes place without excessively high assembly forces arising in the process.

The fixing of the bearing disc 3 to the brake caliper 22 can be disassembled, that is to say a suitable tool may be used to remove the locking element 16, wherein the bearing disc 3 can likewise be released by means of a corresponding tool and the adjusting device 1 can be removed, for example in order to be exchanged.

| Table of Reference Numerals | |
|---|---|
| 1 | Adjusting device |
| 2 | Shaft |
| 3 | Bearing disc |
| 4 | Collar bush |
| 5 | Axial bearing |
| 6 | Drive ring |
| 7 | Ball ramp clutch |
| 8 | Clutch ring |
| 9 | Lug |
| 10 | Deformation section |
| 11 | Leadthrough |
| 12 | Cylindrical spring |
| 13 | Recess |
| 14 | Spring sleeve |
| 15 | Profiled disc |
| 16 | Locking element |
| 17 | Cone clutch |
| 18 | Sleeve cone |
| 19 | Spacer sleeve |
| 20 | Disc brake |

| Table of Reference Numerals | |
|---|---|
| 21 | Brake disc |
| 22 | Brake caliper |
| 23 | Brake pads |
| 24 | Cross-member (bridge) |
| 25 | First adjusting spindle |
| 26 | Second adjusting spindle |
| 27 | Thrust piece |
| 28 | Sprockets |
| 29 | Chain |
| 30 | Eccentric |
| 31 | Rotary lever |
| 32 | Drive element |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for fixing a wear adjustor on a disc brake, the method comprising the acts of:
   inserting the wear adjustor in a previously set rest position into an adjusting spindle of the disc brake, with a drive ring of the wear adjustor being coupled to a rotary lever of the disc brake and with the wear adjustor being centered in a receptacle of a brake caliper via a bearing disc;
   positioning the wear adjustor in a defined angular orientation; and
   fixing the wear adjustor to the disc brake by locking the bearing disc to the caliper via a locking element.

2. The method according to claim 1, wherein the act of centering the wear adjustor further comprises the act of arranging the bearing disc having a deformation section over a recess in the caliper.

3. The method according to claim 2, wherein the act of locking the bearing disc to the caliper further comprises the act of using the locking element to press the deformation section into the recess in order to form a positive-fitting connection of the bearing disc to the caliper.

4. The method according to claim 1, wherein the locking element is a ball.

5. The method according to claim 1, wherein the locking element is a pin.

6. The method according to claim 1, wherein the disc brake is a pneumatic disc brake.

7. A method for securing a wear adjustor in a caliper of a pneumatic disc brake having a rotary lever actuated brake application device that includes an adjusting spindle, the method comprising the acts of:
   in a rest position, centering the wear adjustor in a receptacle of the caliper via a bearing disc upon inserting the wear adjustor into the adjusting spindle of the brake application device, wherein a drive ring of the wear adjustor is coupled to the rotary lever; and
   locking the bearing disc to the caliper via a locking element to secure the wear adjustor.

8. The method according to claim 7, wherein the centering act further comprises the act of arranging the bearing disc with a deformation section over a recess of the caliper.

9. The method according to claim 7, wherein the locking act further comprises the act of pressing the locking element so as to deform a deformation section into a recess to provide a positive-fit connection of the bearing disc to the caliper.

10. The method according to claim 7, wherein the locking element is a ball or pin.

11. The method according to claim 9, further comprising the act of:

unlocking the bearing disc from the caliper by removing the locking element.

* * * * *